United States Patent [19]

Karmarkar et al.

[11] Patent Number: 4,914,615
[45] Date of Patent: Apr. 3, 1990

[54] CALCULATOR OF MATRIX PRODUCTS

[75] Inventors: Narendra K. Karmarkar, North Plainfield; Kajamalai G. Ramakrishnan, Hillsborough, both of N.J.

[73] Assignee: AT&T Bell Laboratories, Murray Hill, N.J.

[21] Appl. No.: 94,634

[22] Filed: Sep. 4, 1987

[51] Int. Cl.[4] .............................................. G06F 15/349
[52] U.S. Cl. ...................................... 364/754; 364/402
[58] Field of Search ............... 364/402, 148, 153, 754; 379/113, 221

[56] References Cited

U.S. PATENT DOCUMENTS

| | | | |
|---|---|---|---|
| 3,974,481 | 8/1976 | Ledieu | 364/402 X |
| 4,744,026 | 5/1988 | Vandebei | 364/402 |
| 4,744,027 | 5/1988 | Bayer | 364/402 |
| 4,744,028 | 5/1988 | Karmarker | 364/402 |

OTHER PUBLICATIONS

Berge; Richard T., "Solving Matrix Problems on Small Computers", *Electro-Technology*; Sep., 1967; pp. 44,45.
Chandra, A. K.; "Matrix Multiplication on a Parallel Processing Machine"; *IBM Technical Disclosure Bulletin;* vol. 19, No. 12, May, 1977, pp. 4830–483.
*Linear Programming and Extensions,* G. B. Dantzig, 1963, Princeton University Press, Princeton, N.J., pp. 156–167.
*Combinatorica,* vol. 4, No. 4, 1984, "A New Polynominal-Time Algorithm for Linear Programming", N. Karmarkar, pp. 373-395.

*Primary Examiner*—Eugene R. LaRoche
*Assistant Examiner*—Benny Lee
*Attorney, Agent, or Firm*—Henry T. Brendzel

[57] ABSTRACT

Apparatus and method for efficient multiplication of a matrix by a vector. The multiplication is realized by rearranging the matrix so that a plurality of adjacent columns form a set, and each set is characterized by a certain pattern in each column. One set contains columns of only a single $\pm 1$ entry, another set contains columns with two $\pm 1$ entries, and still another set contains columns with entries that are other than $\pm 1$. Each of the sets is treated differently during the calculations in accordance with a maximal * cover approach, and a result is developed by multiplying each row in the rearranged matrix by a corresponding element of the vector to form partial results, and accumulating the partial results.

4 Claims, 5 Drawing Sheets

FIG. 6

$$\begin{bmatrix} 5 & 0 & 0 & 0 & 1 & 0 \\ 0 & 0 & 3 & 1 & 0 & 0 \\ 0 & 3 & 2 & 0 & 1 & 0 \\ 0 & 1 & 0 & 0 & 0 & 1 \\ 1 & 0 & 1 & 0 & 0 & 0 \\ 0 & 0 & 0 & 1 & 0 & 0 \end{bmatrix} \longrightarrow$$

DATA: 5, 1, 3, 1, 3, 2, 1, 1, 1, 1, 1, 1
i-LIST: 1, 5, 3, 4, 2, 3, 5, 2, 6, 1, 3, 4
j-LIST: 1, 3, 5, 8, 10, 12, 13

FIG. 7

ORIGINAL MATRIX $$\begin{bmatrix} 0 & 0 & 0 & 1 & 0 & 0 & 1 & 0 & 0 & 0 & 0 & 0 & 0 & 0 \\ 0 & 0 & 0 & 0 & 0 & 0 & 0 & 0 & 0 & 1 & 0 & 0 & 0 \\ 0 & 0 & 0 & 0 & 0 & 0 & 0 & 2 & 0 & 0 & 0 & 0 & 0 & 0 \\ 1 & 0 & 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 & 0 & 0 \\ 0 & 0 & 0 & 0 & 0 & 1 & 0 & 0 & 1 & 0 & 0 & 0 & 0 & 0 \\ 1 & 0 & 0 & 0 & 0 & 0 & 1 & 0 & 1 & 0 & 0 & 1 & 0 \\ 0 & 0 & 2 & 0 & 0 & 0 & 0 & 0 & 0 & 0 & 0 & 0 & 0 & 0 \\ 0 & 0 & 0 & 0 & 0 & 1 & 0 & 0 & 0 & 0 & 0 & 1 & 0 & 0 \\ 0 & 0 & 0 & 0 & 1 & 0 & 1 & 0 & 0 & 0 & 0 & 0 & 1 & 0 \\ 0 & 1 & 0 & 0 & 0 & 0 & 0 & 0 & 0 & 0 & 0 & 0 & 1 & 0 \\ 0 & 0 & 0 & 0 & 0 & 0 & 0 & 0 & 1 & 0 & 0 & 0 & 0 & 0 \\ 0 & 0 & 0 & 0 & 0 & 0 & 1 & 0 & 0 & 1 & 1 & 0 & 0 & 0 \\ 0 & 0 & 0 & 0 & 0 & 0 & 0 & 0 & 0 & 0 & 0 & 0 & 0 & 1 \end{bmatrix}$$

REARRANGED MATRIX $$\begin{bmatrix} 0 & 0 & 0 & 1 & 0 & 0 & 0 & 0 & 0 & 0 & 0 & 0 & 1 & 0 \\ 0 & 0 & 0 & 0 & 0 & 0 & 0 & 0 & 0 & 0 & 0 & 1 & 0 & 0 \\ 0 & 2 & 0 & 0 & 0 & 0 & 0 & 0 & 0 & 0 & 0 & 0 & 0 & 0 \\ 0 & 0 & 0 & 0 & 0 & 0 & 0 & 1 & 0 & 0 & 0 & 0 & 0 & 0 \\ 0 & 0 & 0 & 0 & 0 & 0 & 0 & 0 & 0 & 0 & 0 & 0 & 0 & 0 \\ 0 & 0 & 0 & 0 & 0 & 0 & 0 & 1 & 1 & 0 & 0 & 0 & 0 \\ 0 & 1 & 0 & 0 & 0 & 0 & 1 & 0 & 0 & 1 & 0 & 0 & 1 \\ 2 & 0 & 0 & 0 & 0 & 0 & 0 & 0 & 0 & 0 & 0 & 0 & 0 & 0 \\ 0 & 0 & 0 & 0 & 1 & 0 & 0 & 1 & 0 & 0 & 0 & 0 & 0 \\ 0 & 0 & 0 & 0 & 1 & 0 & 0 & 0 & 0 & 0 & 0 & 1 & 1 \\ 0 & 0 & 1 & 0 & 0 & 0 & 0 & 0 & 0 & 0 & 0 & 0 & 0 & 1 \\ 0 & 0 & 0 & 0 & 0 & 0 & 0 & 0 & 1 & 0 & 0 & 0 & 0 \\ 0 & 0 & 0 & 0 & 0 & 0 & 0 & 0 & 0 & 1 & 1 & 1 & 0 \\ 0 & 0 & 0 & 0 & 0 & 0 & 1 & 0 & 0 & 0 & 0 & 0 & 0 \end{bmatrix}$$

DATA: 2, 2, 1
i-LIST: 8, 3, 7, 11, 1, 10, 9, 14, 4, 7, 6, 9, 6, 12, 7, 13, 2, 13, 1, 10, 13, 7, 10, 11
j-LIST: 1, 2, 4
k-LIST: 1, 4, 9, 19, 25

FIG. 8

$$\begin{bmatrix} 1 & 1 & 1 & 0 & 0 & 0 & 0 & 0 & 0 & 0 & 0 & 1 & 0 & 0 & 0 \\ 0 & 0 & 0 & 1 & 1 & 1 & 0 & 0 & 0 & 0 & 0 & 0 & 1 & 0 & 0 \\ 0 & 0 & 0 & 0 & 0 & 0 & 1 & 1 & 1 & 0 & 0 & 0 & 0 & 1 & 0 \\ 0 & 0 & 0 & 0 & 0 & 0 & 0 & 0 & 0 & 1 & 1 & 1 & 0 & 0 & 1 \\ 1 & 0 & 0 & 1 & 0 & 0 & 1 & 0 & 0 & 1 & 0 & 0 & 0 & 0 & 0 \\ 0 & 1 & 0 & 0 & 1 & 0 & 0 & 1 & 0 & 0 & 1 & 0 & 0 & 0 & 0 \\ 0 & 0 & 1 & 0 & 0 & 1 & 0 & 0 & 1 & 0 & 0 & 1 & 0 & 0 & 0 \end{bmatrix}$$

CALCULATOR OF MATRIX PRODUCTS

TECHNICAL FIELD

This invention relates to computing systems, and more particularly to apparatus and methods for efficiently developing matrix products, particluarly for products that involve sparse matrices.

BACKGROUND OF THE INVENTION

The impetus for this invention arose from work performed in furtherance of the Karmarkar method for optimizing the performance of commercial systems or enterprises. To gain understanding of this invention and its significance, the description below parallels the description of an invention for which an application for patent, entitled "Preconditioned Conjugate Gradient Method", was filed in the U.S. Patent and Trademark Office on even date herewith.

The need for optimization of systems arises in a broad range of technological and industrial areas. Examples of such a need include the assignment of transmission facilities in telephone transmission systems, oil tanker scheduling, control of the product mix in a factory, deployment of industrial equipment, inventory control, and others. In these examples a plurality of essentially like parameters are controlled to achieve an optimum behavior or result. Sometimes, the parameters controlling the behavior of a system have many different characteristics but their effect is the same; to wit they combine to define the behavior of the system. An example of that is the airline scheduling task. Not only must one take account of such matters as aircraft, crew, and fuel availability at particular airports, but it is also desirable to account for different costs at different locations, the permissible routes, desirable route patterns, arrival and departure time considerations vis-a-vis one's own airline and competitor airlines, the prevailing travel patterns to and from different cities, etc. Two common denominators of all of these applications is the existence of many parameters or variables that can be controlled, and the presence of an objective to select values for the variables so that, in combination, an optimum result is achieved.

The relationships describing the permissible values of the various variables and their relationship to each other form a set of constraint relationships. Optimization decisions are typically subject to constraints. Resources, for example, are always limited in overall availability and, sometimes, the usefulness of a particular resource in a specific application is limited. The challenge, then, is to select values of the parameters of the system so as to satisfy all of the constraints and concurrently optimize its behavior, i.e., bring the level of "goodness" of the objective function to its maximum attainable level. Stated in other words, given a system where resources are limited, the objective is to allocate resources in such a manner so as to optimize the system's performance.

One method of characterizing optimization tasks is via the linear programming model. Such a model consists of a set of linear equalities and inequalities that represent the quantitative relationships between the various possible system parameters, their constraints, and their costs (or benefits). Describing complex systems, such as a commercial endeavor, in terms of a system of linear equations often results in extremely large numbers of variables and constraints placed on those variables. Until recently, artisans were unable to explicitly solve many of the optimization tasks that were facing them primarily because of the large size of the task.

The best known prior art approach to solving allocation problems posed as linear programming models is known as the simplex method. It was invented by George B. Dantzig in 1947, and described in Linear Programming and Extension, by George B. Dantzig, Princeton University Press, Princeton, New Jersey, 1963. In the simplex method, the first step is to select an initial feasible allocation as a starting point. The simplex method gives a particular method for identifying successive new allocations, where each new allocation improves the objective function compared to the immediately previous identified allocation, and the process is repeated until the identified allocation can no longer be improved.

The operation of the simplex method can be illustrated diagrammatically. In two-dimensional systems the solutions of a set of linear constraint relationships are given by a polygon of feasible solutions. In a three-dimensional problem, linear constraint relationships form a three dimensional polytope of feasible solutions. As may be expected, optimization tasks with more than three variables form higher dimensional polytopes. FIG. 1 depicts a polytope contained within a multi-dimensional hyperspace (the representation is actually shown in three dimensions for lack of means to represent higher dimensions). It has a plurality of facets, such as facet 11, and each of the facets is a graphical representation of a portion of one of the constraint relationships in the formal linear programming model. That is, each linear constraint defines a hyperplane in the multi-dimensional space of polytope 10, and a portion of that plane forms a facet of polytope 10. Polytope 10 is convex, in the sense that a line joining any two points of polytope 10 lies within or on the surface of the polytope.

It is well known that there exists a solution of a linear programming model which maximizes (or minimizes) an objective function, and that the solution lies at a vertex of polytope 10. The strategy of the simplex method is to successively identify from each vertex the adjacent vertices of polytope 10, and select each new vertex (each representing a new feasible solution of the optimization task under consideration) so as to bring the feasible solution closer, as measured by the objective function, to the optimum point 21. In FIG. 1, the simplex method might first identify vertex 12 and then move in a path 13 from vertex to vertex (14 through 20) until arriving at the optimum point 21.

The simplex method is thus constrained to move on the surface of polytope 10 from one vertex of polytope 10 to an adjacent vertex along an edge. In linear programming problems involving thousands, hundreds of thousands, or even millions of variables, the number of vertices on the polytope increases correspondingly, and so does the length of path 13. Moreover, there are so-called "worst case" problems where the topology of the polytope is such that a substantial fraction of the vertices must be traversed to reach the optimum vertex.

As a result of these and other factors, the average computation time needed to solve a linear programming model by the simplex method appears to grow at least proportionally to the square of the number of constraints in the model. For even moderately-sized allocation problems, this time is often so large that using the simplex method is simply not practical. This occurs, for example, where the constraints change before an optimum allocation can be computed, or the computation facilities necessary to optimize allocations using the model are simply not available at a reasonable cost. Optimum allocations could not generally be made in "real time" (i.e., sufficiently fast) to provide more or less continuous control of an ongoing process, system or apparatus.

To overcome the computational difficulties in the above and other methods, N. K. Karmarkar invented a new method, and apparatus for carrying out his method, that substantially improves the process of resource allocation. In accordance with Karmarkar's method, which is disclosed in U.S. Pat. No. 4,744,028 issued May 10, 1988, a starting feasible solution is selected within polytope 10, and a series of moves are made in the direction that, locally, points to the direction of greatest change toward the optimum vertex of the polytope. A step of computable size is then taken in that direction, and the process repeats until a point is reached that is close enough to the desired optimum point to permit identification of the optimum point.

Describing the Karmarkar invention more specifically, a point in the interior of polytope 10 is used as the starting point. Using a change of variables which preserves linearity and convexity, the variables in the linear programming model are transformed so that the starting point is substantially at the center of the transformed polytope and all of the facets are more or less equidistant from the center. The objective function is also transformed. The next point is selected by moving in the direction of steepest change in the transformed objective function by a distance (in a straight line) constrained by the boundaries of the polytope (to avoid leaving the polytope interior). Finally, an inverse transformation is performed on the new allocation point to return that point to the original variables, i.e., to the space of the original polytope. Using the transformed new point as a new starting point, the entire process is repeated.

Karmarkar describes two related "rescaling" transformations for moving a point to the center of the polytope. The first uses a projective transformation, and the second method uses an affine transformation. These lead to closely related procedures, which we call projective scaling and affine scaling, respectively. The projective scaling procedure is described in detail in N. K. Karmarkar's paper, "A New Polynomial Time Algorithm for Linear Programming", Combinatorica, Vol. 4, No. 4, 1934, pp. 373–395, and the affine scaling method is described in the aforementioned N. Karmarkar 028 patent and U.S. Pat. No. 4,744,026 issued May 10, 1988 to Vanderbei.

The advantages of the Karmarkar invention derive primarily from the fact that each step is radial within the polytope rather than circumferential on the polytope surface and, therefore, many fewer steps are necessary to converge on the optimum point.

To proceed with the Karmarkar method, it is best to set up the optimization task in matrix notation, transformed to the following canonical form:

minimize; $c^T x$ (1)

Subject to: $Ax = b$

In the above statement of the task, $x=(x_1, x_2, \ldots, x_n)$ is a vector of the system attributes which, as a whole, describe the state of the system; n is the number of such system attributes; $c=(c_1, c_2, \ldots, c_n)$ is a vector describing the objective function which minimizes costs, where "cost" is whatever adversely affects the performance of the system; $c^T$ is the transpose of vector c;

$A=(a_{11}, a_{12}, \ldots, a_{ij}, \ldots, a_{mm})$ is an m by n matrix of constraint coefficients;

$b=(b_1, b_2, \ldots, b_m)$ is a vector of m constraint limits.

In carrying out the method first invented by Karmarkar, various computational steps are required. These are depicted in FIG. 2, which is similar to one of the drawings in the aforementioned Karmarkar patent application. The various vectors and matrices referred to in FIG. 2 are not essential to the understanding of the invention disclosed herein, and therefore are not discussed further. We wish to merely note that the step which is computationally most demanding is the step in block 165 that requires the use of the matrix inverse $(AD^2A^T)^{-1}$. Developing that inverse is tantamount to solving (for the unknown u) the positive definite system of linear equations $$AD^2A^T u = p \qquad (2)$$

or $$Qu = p,$$

where D is an affine scaling diagonal matrix, p is AD, and $Q=AD^2A^T$.

A number of methods are known in the art for solving a system of linear equations. These include the various direct methods such as the Gaussian elimination method, and various iterative methods such as the relaxation methods and the conjugate gradient method. These methods are well known, but for completeness of this description they are described herein in abbreviated form.

The Gaussian elimination method for solving a system of linear equations is the method most often taught in school. It comprises a collection of steps, where two linear equations are combined at each step to eliminate one variable. Proceeding in this manner, an equation is arrived at that contains a single variable; a solution for that variable is computed; and a solution for the other variables is derived by back tracking. It can be shown that the process of eliminating variables to reach an equation with a single variable is a transformation of the given matrix which has non-zero values at arbitrary locations within the matrix into a matrix that contains nothing but zeros in the lower triangular half. The Gaussian elimination method is poorly suited for solving a very large system of linear equations because the process of transforming the original matrix into the matrix with a zero lower triangular portion introduces many non-zero terms into the upper triangular portion of the matrix. This does not present a problem in applications of the method to small systems, but in large systems it represents a major drawback. For example, in a large system where the A matrix contains $10^6$ equations and $10^6$ unknowns, the potential number of non-zero terms in the upper triangular portion is $10^{11}$. Presently there is no hope of dealing with such a large number of non-zero terms, even in terms of just storing the values. Fortunately, physical systems of the type whose optimization is desired are sparse; which means that bulk of the terms in the matrix is zero. A method that does not exhibit "fill-in" as the Gaussian elimination method would have to deal with many fewer non-zero terms. For example, in a system that contains only five non-zero terms in each column presents a total number of $5 \times 10^6$ non-zero terms in the above example. That is much more manageable.

The use of relaxation methods in connection with large matrices is also not recommended because there is no assurance that a solution will be reached in reasonable time. The Gauss-Seidel method for example, works by guessing a first approximate, solution and computing from that a new approximate solution that is closer to the true solution of the system. Successive iterations eventually yield the actual solution to the system, but the number of required iterations is highly dependent of the initial choice.

In many of the above described methods, as well as in the novel conjugate gradient method disclosed below, it is necessary to perform a multiplication of a matrix by a vector. There are standard techniques for doing this, but they do not take advantage of certain characteristics that matrices often have which permit a faster and therefore more efficient realization of the desired product.

SUMMARY OF THE INVENTION

In accordance with the principles of our invention, efficient multiplication of a matrix by a vector is realized in a special purpose calculator where the signals representing the matrix are rearranged so that a plurality of adjacent columns of the matrix form a set, and each set is characterized by a certain pattern in each column. One set contains columns of only a single $\pm 1$ entry, another set contains columns with two $\pm 1$ entries, and still another set contains columns with entries that are other than $\pm 1$. Each of the sets is treated differently during the calculations in accordance with a maximal cover approach, and a result is developed by multiplying each row in the rearranged matrix by a corresponding element of the vector to form partial results, and accumulating the partial results.

BRIEF DESCRIPTION OF THE DRAWING

FIGS. 6 and 7 illustrate sparse matrix representations; and FIG. 8 illustrates the advantages of maximal cover that is employed by our calculator.

DETAILED DESCRIPTION

The Conjugate Gradient Method

Figure 1:
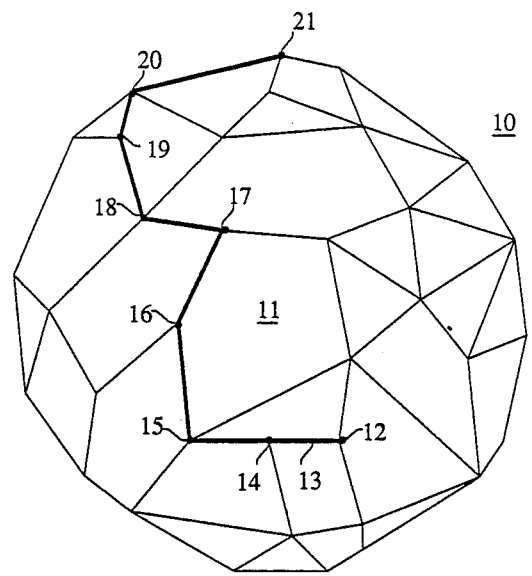
FIG. 1 provides a pictorial representation of the optimization problem when viewed as a polytope in a multi-dimensional space.

Like the Gauss-Seidel method, the conjugate gradient method is an iterative method. However, it has the property that the exact solution can be obtained in a finite number of steps. That finite number is n, which is the number of constraint relationships in the A matrix. In practice, the exact solution can be often obtained in many fewer steps. This attribute of the conjugate gradient method makes it very attractive for our optimization tasks because the tasks we often deal with have a very large number of n; and a method where the solution is arrived at in proportion to n is much superior to one where the solution is arrived at as a power of n or a constant (greater than 1) raised to a power of n.

Summarizing the conjugate gradient method for solving a system of linear equations, the following describes the eight primary steps in the method.

Step 1. $i \leftarrow 0; u^{(0)} = 0;$ set $d^{(0)} = -g^{(0)} = +p$

This step sets the iteration index i to zero and sets the initial value for vector u to zero. It also sets, the initial direction of movement, vector $d^{(0)}$, to the negative of the initial gradient vector, $g^{(0)}$ (which is equal to vector p). By definition, $g^{(i)} \equiv g(u^{(i)})$.

Step 2. $q = Qd^{(i)}$

This step computes the intermediate vector q, where $Q = AD^2A^T$.

Step 3. $\alpha = \dfrac{g^{(i)T}g^{(i)}}{d^{(i)T}q}$

This step computes a step length, $\alpha$, which is a scalar value.

Step 4. $u^{(i+1)} = u^{(i)} + \alpha d^{(i)}$

This step updates the solution by deriving a new, updated, value for the vector u.

Step 5. $g^{(i+1)} = g^{(i)} + \alpha q$

This step computes a new gradient at the updated value of the vector u.

Step 6. $\beta = \dfrac{g^{(i+1)T}g^{(i+1)}}{g^{(i)T}g^{(i)}}$

This step computes a scalar multiplier to be used in the following step.

Step 7. $d^{(i+1)} = -g^{(i+1)} + \beta d^{(i)}$

This step computes a new direction of movement towards the solution.

Step 8. $i = i+1$; test for termination of procedure.

This step tests to determine whether the most current value of the vector u is sufficiently close to the desired solution. If it is not, the process returns to step 2; otherwise, the procedure terminates.

The Preconditioned Conjugate Gradient Method

As indicated above, the above procedure results in an exact solution in n steps, where n is the number of variables. On the average, however, a solution is obtained in a smaller number of steps, which number is closely related to $$\sqrt{\lambda_{max}/\lambda_{min}}$$

where $\lambda_{max}$ is the largest eigenvalue and $\lambda_{min}$ is the smallest eigenvalue of the matrix in the equation to be solved. Our optimizer can benefit greatly from a reduction in the spread between the largest and the smallest eigenvalue (i.e., the dynamic range of the eigenvalues).

The eigenvalues of a matrix can indeed be altered by transforming, or conditioning, the matrix to reduce the dynamic range of the eigenvalues and to thereby reduce the number of iterative steps that are required to solve the system of linear equations. It can be shown that the set of steps that are taken in the above-described Gaussian elimination method to modify the matrix so that the lower triangular half is zero, is a collection of such conditioning steps. That is, the modified matrix with a zero lower triangular half, e.g., $B_M$, is derived by the following;

$$B_M = E_N E_{N-1} \ldots E_2 E_1 B$$

where B is the original matrix and each E is a matrix with a zero upper triangular half, 1's on the diagonal, and one non-zero term in the lower triangular half. The order of the $E_i$ is important, because of the above-described "fill-in" phenomenon. Actually, a solution for all the variables can be achieved in a single step ($\lambda_{max} = \lambda_{min}$) by transforming the matrix still further to make it a diagonal matrix; i.e., $$B_M = E_N E_{N-1} \ldots E_2 E_1 B F_1 F_2 \ldots F_{N-1} F_N$$

The conditioning matrices $F_i$ are equal to $E_i^T$ when the matrix B is symmetric.

In light of the above, preconditioning of Equation (2) can be performed by multiplying both sides of the equation by preconditioning matrix L, to yield $$LAD^2 A^T u = Lp$$

where $$L = E_N E_{N-1} \ldots E_2 E_1$$

or $$Gy = Lp \quad (3)$$

where now we have a new G that is equal to $LAD^2 A^T L^T$ and y is such that $u = L^T y$.

Although a preconditioning step is useful as shown above, because of the "fill-in" phenomenon in very large problems it is not desirable to perform the calculations that are needed in order to obtain the diagonal matrix. In accordance with our invention, we mitigate against that condition by the use of a pre-drop and a post-drop technique that tends to maintain the sparsity of the matrix.

With respect to pre-drop, we observe that at any iteration of the Karmarkar algorithm we deal with elements of $AD_k$, which is the current affine scaled constraint matrix at iteration k. Our pre-drop technique is to apply a threshold test on each non-zero, off-diagonal, element in the matrix prior to any transformations of the matrix. We keep the terms that have a value which exceeds the threshold, and set to zero the terms that have a value that does not exceed the threshold. Different threshold tests can, of course, be employed. Our test compares each element $(AD_k)_{ij}$ to $$\eta \sqrt{\sum_j (a_{ij} d_j)^2}$$

where $\eta$ is a scalar constant and $d_j$ is the diagonal element of matrix D in row j and column j.

Thus, the pre-drop operation takes a matrix that has zero terms, relatively large non-zero terms, and relatively small non-zero terms, and converts it to a matrix where the relatively small non-zero terms are set to zero. The resulting matrix is an approximation of the initial matrix, with the difference being that it is sparser than the original matrix.

Unlike the pre-drop operation which deals with elements of the matrix $AD_k$ (and thus elements of $AD_k^2 A^T$) directly, the post-drop operation directs attention to the precoditioning matrices, $E_i$. As indicated above, each of the $E_i$ matrices has only one row in the lower triangular half which has a non-zero term other than in the diagonal. That term is related to the specific term in the matrix that we wish to eliminate. For example, the matrix E may be:

$$E = \begin{bmatrix} 1 & & & & & \\ 0 & 1 & & & & \\ 0 & 0 & 1 & 0 & & \\ 0 & 0 & 0 & 1 & & \\ 0 & \epsilon & 0 & 0 & 1 & \\ 0 & 0 & 0 & 0 & 0 & 1 \end{bmatrix}$$

Pre-multiplying a matrix by the E matrix shown above causes the second row in in the matrix to be multiplied by $\epsilon$ and added to the fifth row, thereby eliminating the second variable from the fifth row.

In accordance with our post-drop method, when that non-zero term $\epsilon$ is small enough, we simply do not employ that particular elementary transformation matrix. Since $\epsilon$ is related to $a_{ij}$, $a_{ii}$, and $a_{jj}$, our test reduces to:

if $a_{ij} > \delta \sqrt{a_{ii} a_{jj}}$, where $\delta$ is a scalar constant, then keep $a_{ij}$;

otherwise ignore the elementary transformation corresponding to $a_{ij}$.

Our invention contemplates employing the pre-drop and post-drop techniques in sequence. The sequence consists of three distinct steps:

(i) Given the matrix $(AD_k)$, apply the pre-drop heuristic to all non-zero off-diagonal elements, to obtain $(AD_k)_{app}$.

(ii) From the matrix $(AD_k)_{app} (AD_k)_{app}^T$.

(iii) Carry out the Gaussian elimination on $(AD_k)_{app} (AD_k)_{app}^T$.

(iv) During each elementary transformation step of the Gaussian elimination, apply the post-drop technique.

The end result of these transformations is a matrix that comprises mostly zeros, relatively large numbers along the diagonal and some relatively small numbers off the diagonal. The numbers off the diagonal are the remains of the post-drop operations where some elementary transformations were not carried out.

The eigenvalues of such a matrix have a relatively small dynamic range and, consequently, a conjugate gradient solution for such a matrix can be arrived at with very few steps.

It may be observed that the above described pre-drop and post-drop operations are highly dependent on the selected constants $\eta$ and $\delta$. By changing these constants we trade the quality of the preconditioning for speed of operation. We can also trade quality for speed by simply re-using the previously computed preconditioning matrix. Combining the two—particularly when the Karmarkar step size is small and the D matrix is expected to not change substantially—, we proceed to solve Equation (2) at each iteration of the Karmarkar method (in block 165, FIG. 2) by employing the previously computed preconditioning, solving the resulting system of equations using the conjugate gradient process, and test the solution. If the solution is poor, we derive a new preconditioner for the current $AD_k^2A^T$ using the current values of $\eta$ and $\delta$, repeat the solution process, and again evaluate the results. If the solution is still poor, we reduce the values of $\eta$ and $\delta$ and repeat the procedure.

To evaluate the quality of the solution we compare the angle between the current approximation of $AD^2A^Tu$ and p to determine whether it is greater than some preselected level. Our chosen test is to evaluate the magnitude of $$1 - \frac{p^Tz}{||p||_2||z||_2},$$

where $z=AD^2A^Tu$, u is the current solution obtained by the conjugate gradient method, and z is the resulting approximation to p (per Equation (2)).

In the exact Gaussian elimination method (no pre-drop and no post-drop), carrying out the preconditioning results in the G matrix of Equation (3) being a diagonal matrix. Premultiplying by $G^{-\frac{1}{2}}$ yields $G^{-\frac{1}{2}}Gy=G^{-\frac{1}{2}}Lp$, and recognizing that $G^{-\frac{1}{2}}GG^{-\frac{1}{2}}=I$, yields $$v=G^{-\frac{1}{2}}Lp$$

where v is such that $G^{-\frac{1}{2}}v=y$, or $L^TG^{-\frac{1}{2}}v=u$.

The above is the exact Gaussian elimination solution using preconditioning matrix L. However, for the reasons discussed above, we do not wish to employ Gaussian elimination. Therefore, going back to Equation (2) where $AD^2A^Tu=p$ and premultiplying both sides by the matrix product $\widetilde{G}^{-\frac{1}{2}}\widetilde{L}$ (each of the "tilde" matrices being defined below), we reach the result with a new Q matrix which satisfies the equation $$Qv=\widetilde{G}^{-\frac{1}{2}}\widetilde{L}p \qquad (4)$$

where v is such that $\widetilde{L}^T\widetilde{G}^{-\frac{1}{2}}v=u$ and the new $Q=\widetilde{G}^{-\frac{1}{2}}\widetilde{L}AD^2A^T\widetilde{L}^T\widetilde{G}^{-\frac{1}{2}}$. This new Q is an augmented version of the $Q=AD^2A^T$ matrix found in Equation (2).

In the above, the matrix $\widetilde{L}$ is the preconditioning matrix L with some of the elementary transformations $E_i$'s left out, according to our pre-drop and post-drop criteria. The matrix $\widetilde{G}$ is the diagonal matrix obtained by applying $\widetilde{L}$ to $AD^2A^T$ symmetrically, and then ignoring the off-diagonal elements. Stated differently, $\widetilde{L}AD^2A^T\widetilde{L}^T=\bar{G}$, and $\widetilde{G}=diag(\bar{G}_{ii})$. Whereas the matrix, $\bar{G}$ is not a diagonal matrix, the matrix $\widetilde{G}$ is.

Figure 2:
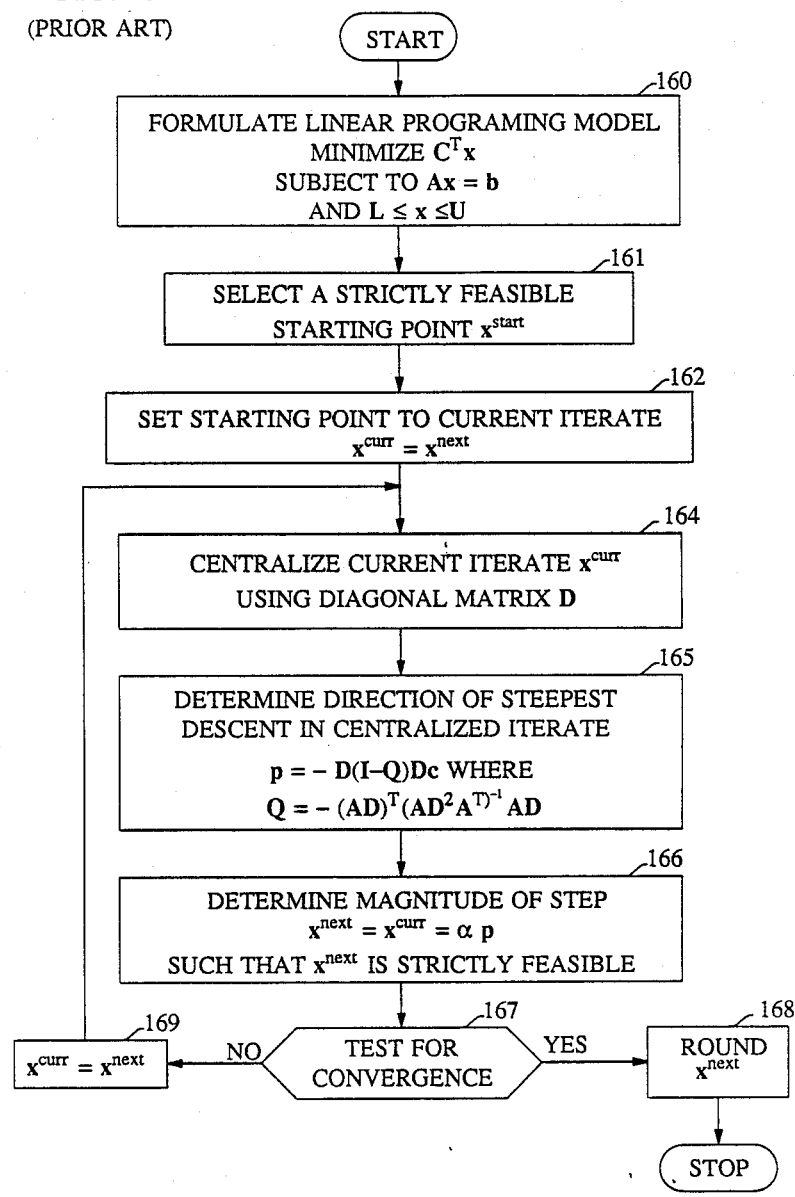
FIG. 2 presents a flow chart depicting the Karmarkar method for optimizing a system.
Figure 3:
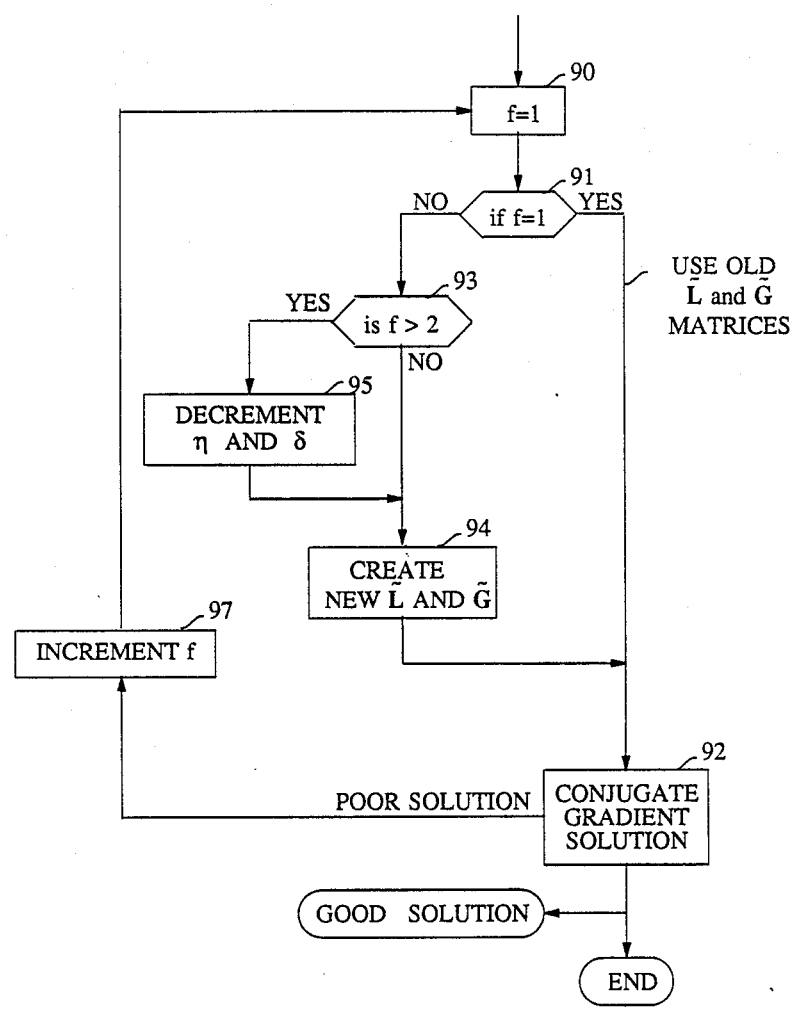
FIG. 3 presents a flow diagram that describes the evaluation in use of preconditioning matrices within the context of conjugate gradient solutions.

FIG. 3 shows the flow chart depicting the above-described process of computing the preconditioners with the appropriate $\eta$ and $\delta$ values, solving the linear system of equations in accordance with the conjugate gradient method, and evaluating the result. FIG. 3, thus, describes the method that assists in carrying out the step described in block 165 of FIG. 2.

In FIG. 3, block 90 sets a flag f to 1. This flag indicates the number of passes through the preconditioning procedure in the current Karmarkar step (i.e., pass through block 165). In accordance with decision block 91, when f=1 we proceed to block 92, apply the existing preconditioner to our current linear system, and solve the resulting equations using the conjugate gradient method. This is the first pass. The process may exit block 92 with a good solution, whereupon the FIG. 3 process ends, or with a poor solution. When a poor solution exit occurs, control passes to block 97 where f is incremented, and thereafter to block 91. When f is greater than 1, we proceed to decision block 93 where we ascertain whether f is greater than 2. When f=2 (which indicates that we are at the second pass), we create new $\widetilde{L}$ and $\widetilde{G}$ matrices in block 94, employing $\eta$ and $\delta$ of preselected values, and proceed to block 92. When f is greater than 2, we interpose block 95 before block 94, wherein we decrement the values of $\eta$ and $\delta$, as appropriate.

The Asymmetric Conjugate Gradient Method

The system of equations with the new Q matrix can be solved in block 92 with the eight step conjugate gradient method described previously. However, this new Q includes the matrix $\widetilde{G}^{-\frac{1}{2}}$, and deriving the matrix $\widetilde{G}^{-\frac{1}{2}}$ involves n square root operations. A computationally more efficient procedure can be obtained by avoiding the square root operations. This is achieved, in accordance with the principles of our invention, by simply evaluating different (primed) vectors d', q', v', and g' inside the conjugate gradient solution block (92). We call this more efficient conjugate gradient method the asymmetric conjugate gradient method.

To develop this method, we consider the definition of q, and the three recurrence relations for updating v, g, and d (see the eight step procedure outlined above). For simplicity, we omit the iteration superscript on the vectors. Thus, starting with $$q=Qd, \text{ where } Q=\widetilde{G}^{-\frac{1}{2}}\widetilde{L}AD^2A^T\widetilde{L}^T\widetilde{G}^{-\frac{1}{2}}$$

$$v=v+\alpha d$$

$$g=g+\alpha q$$

$$d=-g+\beta d,$$

premultiplying each side by $\widetilde{L}^T\widetilde{G}^{-\frac{1}{2}}$, and defining the primed variables q', v', g', and d' as $$q' = \widetilde{L}^T\widetilde{G}^{-1/2}q$$

$$v' = \widetilde{L}^T\widetilde{G}^{-1/2}v$$

$$g' = \widetilde{L}^T\widetilde{G}^{-1/2}g,$$

$$d' = \widetilde{L}^T\widetilde{G}^{-1/2}d,$$

we obtain $$q' = \tilde{L}^T\tilde{G}^{-1}\tilde{L}AD^2A^Td'$$

$$v' = v' + \alpha d'$$

$$g' = g' + \alpha q'$$

$$d' = -g' + \beta d'.$$

This transformation effort has caused the matrix $\tilde{G}$ to appear as $\tilde{G}^{-1}$ in connection with the q' relationship. Computing $G^{-1}$ does not require square root operations. The primed variables are carried through during the procedure. On termination, v' is the approximate solution of the original system of equation $AD^2A^Tu=p$, because $v'=\tilde{L}^T\tilde{G}^{-\frac{1}{2}}v$ and also $u=\tilde{L}^T\tilde{G}^{-\frac{1}{2}}v$.

Figure 4:
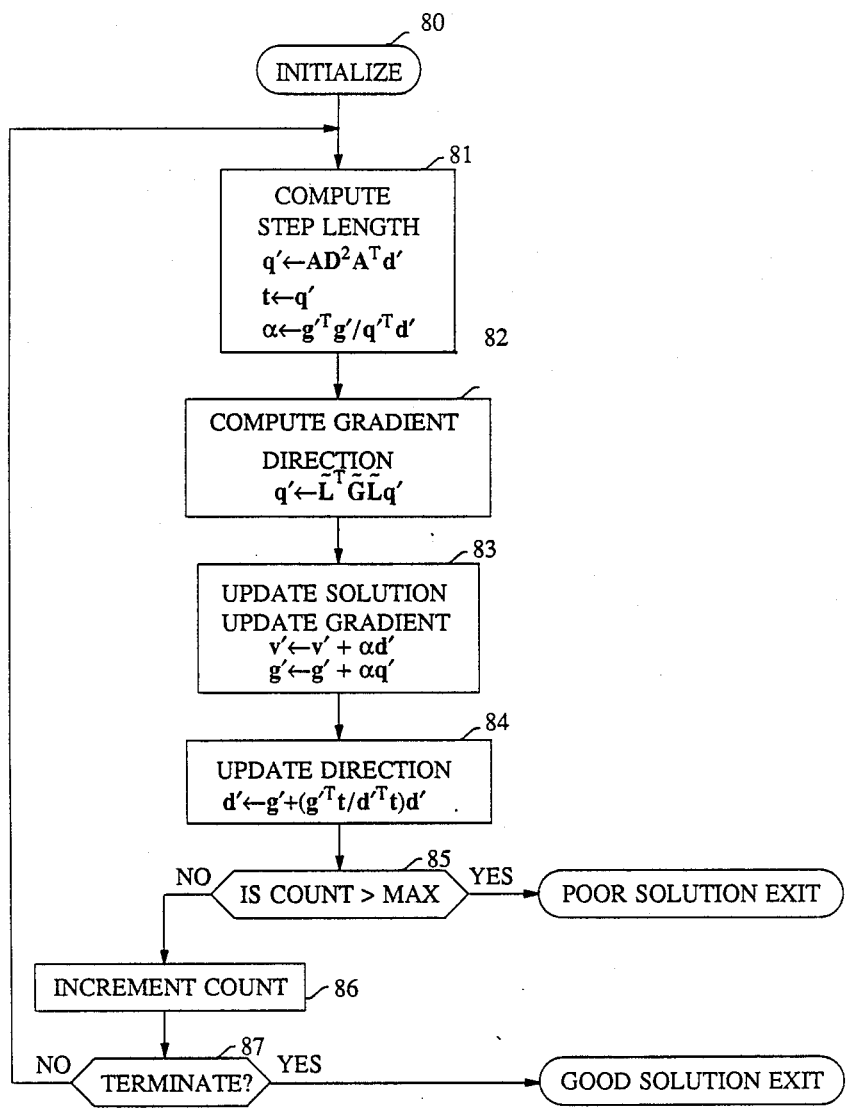
FIG. 4 presents a flow chart depicting the asymmetric conjugate gradient procedure.

The flow chart that carries out the eight step procedure for the asymmetric conjugate gradient method embedded in block 92 is shown in FIG. 4.

Block 81 computes the step length, block 82 computes the new gradient direction, block 83 update the solution vector v' and the gradient g', and block 84 develops the direction d' for the next iteration. Blocks 85-87 evaluate the solution and determine whether a next iteration is to be performed (beginning with block 81) or the process is to be terminated.

Figure 5:
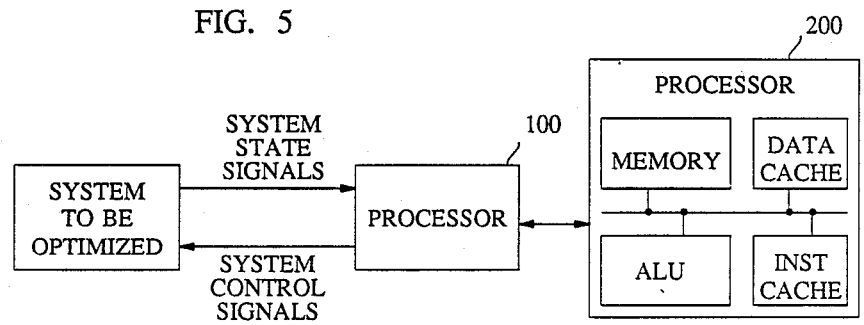
FIG. 5 presents, in part, a block diagram of our matrix calculator which interacts with the system to be optimized through one port that accepts system state information and through another port which controls the system.

Hardware Implementation of the Preconditioned Asymmetric Conjugate Gradient Method In accordance with FIGS. 2-4, our asymmetric conjugate gradient method for realizing the Karmarkar steps in an efficient manner may be implemented with a plurality of interconnected processors, or with a single processor. FIG. 5 illustrates by way of a block diagram the architecture of one preferred embodiment. In FIG. 5, processor 100 in cooperation with processor 200 is responsible for carrying out the method described by FIG. 2. Processor 200 carries out the process of block 92 including, in particular, the necessary matrix product calculations embodied therein, while processor 100 realizes the remaining blocks in FIG. 2. Processor 100 also serves as the interface with the system that utilizes the power of the Karmarkar method, as described above. Thus, processor 100 includes input means for receiving state information of the system whose operation one seeks to optimize, and output control means for affecting the operations of such a system, thereby bringing it closer to an optimum operational state. For example, the input port of processor 100 may, in a telecommunications network, be responsive to traffic load data from the major switches around the country (E.g., No. 4 ESS switching machines in the AT&T Communications Network throughout the U.S.). The output signals of processor 100 would, in such a system, be the controls to the various major switches which affect the link choices that are made within the switches.

In considering the calculation burdens on processor 200 it becomes readily apparent that the heaviest burden is levied by the required matrix multiplications. These burdens are reduced substantially by realizing matrix products in accordance with the principles of our invention, as described below. Although our matrix multiplications can be carried out with a dedicated matrix product calculator, in the context of the Karmarkar method our best mode contemplates the inclusion of other functions in the apparatus performing the matrix product; and hence we realize our calculator in a general purpose processor 200. We assume that processor 200 is a general purpose computer of the fourth generation variety, where there is a communications bus that interconnects the main, relatively slow, memory with a fast data cache and a fast instruction cache. The two caches are connected to the arithmetic logic unit (ALU). In such an architecture, memory accesses should be minimized, as should be the computationally burdensome operations.

Outer Product Matrix Multiplication

The conventional approach to matrix multiplication is known as the inner product method. Given that a product vector z must be developed by carrying out the product $A^Tu$, where A is a matrix and u is a vector, each element $z_j$ is developed by accumulating the products $a_{ji}u_i$ for all non zero elements $a_{ji}$. I.e., the operation performed is $z_j \leftarrow z_j + a_{ji}u_i$. To perform these operations on a processor having the above described architecture, one has to do the following:

| | |
|---|---|
| evaluate the address of $u_i$ | requiring 1 offset calculation |
| access $u_i$ | requiring 1 access operation |
| evaluate the address of $a_{ji}$ | requiring 1 offset calculation |
| access $a_{ji}$ | requiring 1 access operation |
| multiply $a_{ji}u_i$ | requiring 1 multiply calculation |
| evaluate address of $z_j$ | requiring 1 offset calculation |
| access $z_j$ | requiring 1 access operation |
| add and store in $z_j$ | requiring 1 access operation |

The above does not count the required operations that are inherently fast or cannot be optimized, resulting in the computation time for performing a matrix multiplication being basically proportional to 1 double precision multiplication, 3 offset calculations, and 4 memory accesses, for each non zero $a_{ji}$ term. To perform $AD^2A^Tu$ requires only twice (approximately) that amount because the D matrix is a diagonal matrix.

Viewing the matrix/vector multiplication process from a different perspective, it can be observed that in performing the matrix product for $z=AD^2A^Tu$, the resultant vector has the form $$z = \sum_{i=1}^{n} a_i d_i^2 a_i^T u = \sum_{i=1}^{n} d_i^2 (a_i^T u) a_i$$

Viewed this way, the matrix product can be realized by first performing the dot product for each column $a_i a_i^T u$, $\alpha \leftarrow a_i^T u$; multiplying by the diagonal, $\alpha \leftarrow d_i^2 \alpha$; and accumulating, $z \leftarrow z + \alpha a_i$. Again not counting the required operations that are inherently fast or cannot be optimized, the resulting computation time for performing the $AD^2A^Tu$ matrix multiplication is basically proportional to 2 double precision multiplication, 4 offset calculations, and 5 memory accesses; to wit, a saving of 2 offset calculations and three access operations. We call this latter technique the outer product method for matrix multiplication.

Sparse Matrix Representation

In connection with physical systems such as the telecommunications system described above, where the DNHR (Dynamic Non-Hierarchical Routing) telecommunications network is optimized to improve the traffic handling capabilities, the vast majority of the entries in the A matrix are zero, and those that are not zero are either $+1$ or $-1$. Most of the columns are thus very sparse; containing 1, 2, or 3 of these $+1$ or $-1$ entries.

Two consequences flow from this observation: first, that the matrix A should not be stored in conventional form because there is no need to store a large number of 0 entries; second, that non zero entries of +1 and −1 need not employ a double precision multiplication means. Conversely, performing a double precision multiplication on these terms is terribly wasteful.

One approach for storing sparse matrices is to merely store the non-zero entries, sequentially, and to augment the resulting DATA List with lists that specify the positions of those non-zero entries in the matrix. FIG. 6 presents a graphic example of this storage technique. The DATA List specifies the non-zero terms, an i-List specifies the row position of each entry in the DATA List, and a j-List specifies the column boundaries in the i-List. The i-List has a number of entries equal to the number of non-zero matrix entries, while the j-List has a number of entries equal to the number of columns plus 1 in the matrix. In FIG. 6, for example, the j-List sequence is 1, 3, 5, 8, 9, 11, and 13. The "3" means that the third entry in the i-List begins a new (2nd) column, the "5" means that the fifth entry in the i-List begins a new (3nd) column, etc.

Although the above technique saves a considerable amount of storage, the preponderance of the +1 and −1 entries which is found in most physical systems is not being utilized. In accordance with the principles of our invention, significant advantages flow from a reordering of the A matrix to form groupings, as described below.

1. columns that contain entries other than merely +1 and −1 or that contain more than 3 non-zero terms;
2. columns that contain only a single +1 or −1;
3. columns that contain the pattern +1, +1 or the pattern −1, −1;
4. columns that contain the pattern +1, −1 or the pattern −1, +1;
5. columns that contain the pattern +1, +1, +1 or the pattern −1, −1, −1;
6. columns that contain the pattern +1, −1, +1 or the pattern −1, +1, −1;
7. columns that contain the pattern +1, −1, −1 or the pattern −1, +1, +1;
8. columns that contain the pattern +1, +1, −1 or the pattern −1, −1, +1;

This can be extended, of course, beyond the triple pattern.

Having grouped and rearranged the columns as described above, we store only the non-zero and non +1 and −1 values, sequentially, to create a shortened DATA List. The +1 and −1 values are not stored at all (since their values are known, of course). The i-List, as before, stores the row identifications of all of the non-zero elements in the matrix, but the j-List is identifies only the column demarcations of the first (non ±1) group. Consequently, the j-List is also very short. Finally, we include an additional, k-List, that identifies the demarcations between the groups. In FIG. 7, for example, the matrix to the left is the original matrix. Columns 3 and 8 each have a term other than 0 or ±1, while the other columns contain single, double and triple 1's. The matrix to the right is the rearranged matrix. The first 2 columns contain the terms that are other than zero or ±1, the next 5 columns contain the singletons, the next 5 columns contain the doubletons, and the last 2 columns contain the tripletons. As can be seen from FIG. 7, a singleton is a column that has only one non-zero term, a doubleton is a column that has only two non-zero terms, and a tripleton is a column that has only three non-zero terms. The k-List reflects this situation. By the way, it may appear that a pattern such as +1+1+1 is different from the pattern −1−1−1. It turns out, however, that it is not, and that is the reason why there are two patterns in each of the groupings above.

Use of this segregation technique permits us to efficiently avoid double precision multiplication for the vast proportions of the calculations, allows for more efficient storage, and reduces the number of subscript calculations and memory access operations discussed above. In short, our sparse matrix representation technique saves a substantial amount of processing time in processor 200.

Maximal * Cover

There is another phenomenon that occurs frequently in connection with physical systems, and that is the fact that the doubleton and tripleton groupings described above are often characterized by a ±1 in the same row in each of the columns in the grouping, in addition to another ±1 (in doubletons or two ±1's in tripletons) at some other row which is different from column to column.

For example, in a transportation flow system involving, for example, the flow of goods from warehouses to distribution points, a typical statement of the optimization task is:

Minimize $\sum_{i,j} c_{ij} g_{ij}$

Subject to $\sum_{j} g_{ij} \leq S_i$ for $1 \leq i \leq W$ $\sum_{i} g_{ij} = D_j$ for $1 \leq j \leq R$ $g_{ij} \geq 0$ for all i,j.

In the above statement, the $S_i$'s are the supplies that the various warehouses ($1 \leq i \leq W$) can deliver, $D_j$'s are the required goods that retail points ($1 \leq j \leq R$) need, $g_{ij}$ are the goods supplied by a warehouse i to a distribution point j, and $c_{ij}$ is the cost of supplying goods $g_{ij}$. In forming the A matrix corresponding to this cost minimization task, the above equations translate to rows in A with many +1 terms.

To understand the principles involved in maximal * cover, consider the transportation flow system outlined above, comprising four warehouses and three retail points. The optimization task is formulated as above with a W=4, and R=3. The matrix A corresponding to this problem is shown in FIG. 8, where the x vector is {g11, g12, g13, g21, g22, g23, g31, g32, g33, g41, g42, g43, S1, S2, S3, S4}. The matrix in FIG. 8 is arranged so that the first 3 columns have a common row index (namely, row 1) occupied by +1 terms, the next three columns have another common row index (namely, row 2), also occupied by a +1 term, and so on. Considering the outer product version of $$z = AD^2 A^T w = \sum_{i=1}^{16} d_i^2 (a_i^T w) a_i$$

when the first column is processed, the operations performed are:

$z_1 = z_1 + (w_1 + w_5) * d_1^2$ $z_5 = z_5 + (w_1 + w_5) * d_1^2.$

The operations require:

| | |
|---|---|
| fetch $w_1$ | 1 offset + 1 access |
| fetch $w_5$ | 1 offset + 1 access |
| add and multiply by $d_1^2$ | 1 multiply + 1 access |
| fetch $z_1$ | 1 offset + 1 access |
| add | — |
| store back in $z_1$ | 1 offset + 1 access |
| fetch $z_5$ | 1 offset + 1 access |
| add | — |
| store back in $z_5$ | 1 offset + 1 access |

The above shows the macro operations of the outer product $d_1^2(a_1^T W)a_1$, the elementary machine operations involved in accomplishing this outer product, and the various operation counts. The italicized operations occur repeatedly in the coding of the outer product, as can be observed from pursuing the operations shown below, and hence potential savings exist which can be realized in accordance with the maximal * cover method.

Processing column 2 involves the operations $z_1 = z_1 + (w_1 + w_6)^* d_2^2$ $z_6 = z_6 + (w_1 + w_6)^* d_2^2$ and these operations require:

| | |
|---|---|
| fetch $w_1$ | 1 offset + 1 access |
| fetch $w_6$ | 1 offset + 1 access |
| add and multiply by $d_2^2$ | 1 access + 1 multiply |
| fetch $z_1$ | 1 offset + 1 access |
| add | — |
| store back in $z_1$ | 1 offset + 1 access |
| fetch $z_6$ | 1 offset + 1 access |
| add | — |
| store back in $z_6$ | 1 offset + 1 access |

Similarly, processing column 3 involves the operations $$z_1 = z_1 + (w_1 + w_7)^* d_3^2$$
$$z_7 = z_7 + (w_1 + w_7)^* d_3^2$$

and these operations require:

| | |
|---|---|
| fetch $w_1$ | 1 offset + 1 access |
| fetch $w_7$ | 1 offset + 1 access |
| add and multiply by $d_3^2$ | 1 multiply + 1 access |
| fetch $z_1$ | 1 offset + 1 access |
| store back in $z_1$ | 1 offset + 1 access |
| fetch $z_7$ | 1 offset + 1 access |
| add | — |
| store back in $z_7$ | 1 offset + 1 access |

As is evident in the above analysis, the repeated fetching of the common input element $w_1$, and the repeated fetching and storing back of the common output element $z_1$, can be eliminated. To achieve this saving, we simply keep $w_1$ in a processor's hardware register and accumulate $z_1$ in another hardware register. We then perform all operations on the registers to result in a shorter overall code sequence such as:

| | |
|---|---|
| fetch $w_1$ (into r1) | 1 offset + 1 access |
| fetch $w_5$ | 1 offset + 1 access |
| add and multiply by $d_1^2$ | 1 multiply + 1 access |
| fetch $z_1$ (into r2) | 1 offset + 1 access |
| add to r2 | — |
| fetch $z_5$ | 1 offset + 1 access |
| add | — |
| store back in $z_5$ | 1 offset + 1 access |
| fetch $w_6$ | 1 offset + 1 access |
| add and multiply by $d_2^2$ | 1 multiply + 1 access |
| add to r2 | — |
| fetch $z_6$ | 1 offset + 1 access |
| add | — |
| store back in $z_6$ | 1 offset + 1 access |
| fetch $w_7$ | 1 offset 1 access |
| add and multiply by $d_3^2$ | 1 multiply + 1 access |
| add to r2 | — |
| store r2 in $z_1$ | 1 offset + 1 access |
| fetch $z_7$ | 1 offset + 1 access |
| add | — |
| store back in $z_7$ | 1 offset + 1 access |

The above optimization saved 6 offset calculations and 6 memory accesses.

Generalizing on the above, if there is a group of k columns having a ±1 in a common row, then 3(k−1) offset calculations and accesses can be saved.

Maximal *-cover thus "groups" the columns of the matrix (the name "cover" comes from graph theory) according to whether they share a common row index. For each grouping of columns, the common input element is accessed exactly once. Also, the common output element is accessed once, updated for all columns in the group, and stored back once.

The name "maximal" states that when there is more than one possible way of grouping columns, our grouping is the best in terms of saving offset calculations and memory accesses. Thus, to accomplish the maximal * cover, we resort to a graph theoretic model of the sub matrix of A containing all doubleton columns with a given pattern. In the graph, each column is represented by a node, and the existence of a ±1 in row i of any two columns is represented by an edge joining the two nodes corresponding to the two columns. The edge is labeled with the index i. It is easy to see that a "complete" subgraph of k nodes of this graph would represent some k columns having a ±1 in a common row. To obtain the maximal * cover, we first identify the largest complete subgraph of this graph. The nodes in this subgraph and their corresponding columns form one group of the *-cover. We now delete this subgraph from the original graph, and repeat the procedure, to identify other groups of the maximal * cover.

Maximal * cover can be used for all the patterns, not just doubletons. Thus, using maximal *-cover for the 8 patterns described above results in significant savings in code length and consequent computational time.

One additional advantage of maximal * cover is the savings in data storage. In FIG. 7 in the i-list we do not have to store the common row index repeatedly. For instance, in the doubleton columns spanning positions 9–18, row indices 7 and 6 occur twice. With a maximal * cover, they need be stored only once.

The combination of outer product matrix multiplication and maximal *-cover provides our matrix product calculator with substantial advantages over the prior art matrix multipliers.

Code Generation

The above disclosed techniques for reducing the computational burdens associated with the Karmarkar system optimization method have been directed to solving the linear system of equations $AD^2 A^T u = p$. More particularly, we disclosed techniques that are useful in implementing the asymmetric conjugate gradient method, generally, and in efficiently performing the matrix product $AD^2A^Td'$ which is embodied in block 81 of FIG. 4, in particular.

The other computationally intensive step in the Karmarkar method is found in block 82 of FIG. 4, where the calculation $q' \leftarrow \overline{L}^T\overline{G}^{-1}\overline{L}q'$ is carried out. This calculation is normally performed by first developing the product $\overline{L}q'$, then multiplying the result by the diagonal matrix $\overline{G}^{-1}$ and, lastly, multiplying the result by $\overline{L}^T$. The matrix L, however, is itself the product of elementary matrices $E_i$, as described earlier.

In multiplying a vector $q'$ by a matrix $E_i$, where $E_i$ has 1's on the diagonal, zeros everywhere else, and one non-zero value $\epsilon$ at row j and column i in the lower triangular half of the matrix (i.e., $j>i$), the result is a new vector $q'$ where all but one of the elements remain unchanged. Only the $j^{th}$ element changes to $q'_j \leftarrow q'_j + \epsilon q'_i$.

When viewed in this manner, it appears that the matrix product $\overline{L}q'$ which equals $E_tE_{t-1}E_{t-2}\ldots E_3E_2E_1q'$ can be specified by a sequence of elemental operations described by the triplets $j,i,\epsilon$. Each such triplet means: replace element $q'_j$ with $q'_j + \epsilon q'_i$.

Viewed in a table format, the matrix product may be specified by the table

| j | i | $\epsilon$ |
|---|---|---|
| 2 | 1 | $\epsilon_1$ |
| 3 | 1 | $\epsilon_2$ |
| 3 | 2 | $\epsilon_3$ |
| 4 | 1 | $\epsilon_4$ |
| . | | |
| . | | |
| N | N-2 | $\epsilon_{t-1}$ |
| N | N-1 | $\epsilon_t$ | where the entries in the j and i columns are the appropriate indices, while the entries in the $\epsilon$ column are the $\epsilon$ values.

Writing a Fortran subroutine to implement the matrix product from the above table may simply be:

```
DO 10 k=1,t
q(j(k)) = q(j(k)) + ε(k) q(i(k))
10 CONTINUE
```

However, this simple subroutine definition does not give proper insight, because in order to execute the program the Fortran routine must be translated to machine language (complied) and placed in processor 200 in its complied version. That version may be quite lengthy, as shown by way of the example below, where it is assumed that the above $j,i,\epsilon$ table is stored in "row major" order. That is, all of the elements in a row are stored contiguously in the memory. Complied subroutine:

Devote a register $r_1$ to the index k and initialize it to zero.
Obtain and store the memory offsets a)for the above $j,i,\epsilon$ table in register $r_2$, b)for the q' elements in register $r_3$, and c)for the $\epsilon$ elements in register $r_4$.

| add | $r_1$ | 1 | increment $r_1$ by 1. |
| load | $r_5$ | $r_2$ | load $r_5$ with table offset |
| add | $r_5$ | $r_1$ | add table offset to index k |
| loadi | $r_6$ | $r_5$ | load the value of j into $r_6$ |
| add | $r_6$ | $r_3$ | add q' offset to $r_6$ |
| loadi | $r_7$ | $r_6$ | load value of $q'_j$ into $r_7$ |

-continued

Devote a register $r_1$ to the index k and initialize it to zero.
Obtain and store the memory offsets a)for the above $j,i,\epsilon$ table in register $r_2$, b)for the q' elements in register $r_3$, and c)for the $\epsilon$ elements in register $r_4$.

| add | $r_5$ | 1 | increment $r_5$ by 1. |
| loadi | $r_6$ | $r_5$ | load the value of i into $r_6$ |
| add | $r_6$ | $r_3$ | add q' offset to $r_6$ |
| loadi | $r_8$ | $r_6$ | load the value of $q'_i$ into $r_8$ |
| add | $r_5$ | 1 | increment $r_5$ by 1. |
| load | $r_6$ | $r_5$ | load $\epsilon_k$ into $r_6$ |
| mpy | $r_6$ | $r_8$ | multiply contents of $r_6$ by contents of $r_8$ and store in $r_6$ |
| add | $r_7$ | $r_6$ | accumulate result in $r_7$ |
| add | $r_5$ | $-2$ | decrement $r_5$ to the j column address |
| loadi | $r_6$ | $r_5$ | get value of j |
| add | $r_6$ | $r_3$ | add q' offset |
| storei | $r_7$ | $r_6$ | store value of $r_7$ in $r_6$ address | go back to increment $r_1$ (third bullet above).

A review of this code reveals that a number of steps can be taken to reduce its length, such as storing the offset index value in $r_1$ rather than the unoffset index value; storing the table in the form i, $\epsilon$, j to eliminate the double access to the address of j; and within the table, storing the actual addresses of $q'$ in the i and j columns rather than the index values. When that is done, the above code can be reduced to the following:

```
load r1 with offset value of index k
add r1 1
loadi r2 r1
add r1 1
loadi r3 r1
mpy r2 r3
add r1 1
loadi r3 r1
add r2 r3
storei r2 r1
```

With a given $j,i,\epsilon$ table, still additional savings can be realized by taking advantage of some observations. First, that some of the $\epsilon$ terms have a value $\pm 1$. That obviates the need for double precision multiplication. Second, the situation may exist where there are entries in the i column, $q'_i$, that do not get updated, which means that they are not found in the j column. Such an entry can be fetched from memory whenever it is called for, but it never needs to be restored in memory, for it is not altered. Additionally, if a variable in the j column needs to be altered with such a free variable, it can be altered at any convenient time. Third, a variable that needs to be altered, i.e., is found in column j, needs to be fetched from memory in preparation for its alteration and stored in memory after its alteration. It saves both a fetching and a storing operation, if such a variable is altered as many times as it needs to be, if at all possible, once it is fetched. If it needs to be altered with a free variable, at some later time (further down the $j,i,\epsilon$ table) than that entry in the table may be moved up. If, on the other hand, it needs to be altered with a variable that is not free, than that table entry may not be moved up. Lastly, if it is not a free variable, but the point where it is altered is further down the table, then the code can still be moved up. For purposes of the contemplated move it can be called a free variable.

In light of the above, we can keep two pointers: one that is cognizant of the row in the $j,i,\epsilon$ table that is due to be coded, and another that twice searches through the table from the first pointer position to the end of the table. During the first pass, the second pointer searches for another entry where the current j table entry is found again in the j column (indicating that variable which has been altered needs to be altered again). During the second pass, the second pointer searches for another entry where the current i table entry is found again in the i column. We define a variable in column i pointed to by the second pointer as a free variable if it is not found in the j column between the first pointer and the second pointer. During the first pass, if a table entry is found where the j table entry is the same as the one pointed to by the first pointer, and the i table entry is free, then that entry is moved to the position immediately below the first pointer. The first pointer is then advanced, code is generated, and the first pass continues. When the first pass ends, the variable that has been altered is stored in memory, and the second pass is begun. During the second pass, if a table entry is found where the i table entry is the same as the one pointed to by the first pointer, and this i table entry found is free, then that entry is also moved to the position immediately below the first pointer. The first pointer is then advanced, code is generated, and the second pass is terminated.

An example may be in order. The table below presents an example where vector $q'$ has 16 elements and the L is generated with a $j,i,\epsilon$ table of 8 entries.

| j | i | $\epsilon$ |
|---|---|---|
| $q'_{15}$ | $q'_5$ | $\epsilon_8$ |
| $q'_{12}$ | $q'_4$ | $\epsilon_7$ |
| $q'_{11}$ | $q'_6$ | $\epsilon_6$ |
| $q'_7$ | $q'_5$ | $\epsilon_5$ |
| $q'_4$ | $q'_2$ | $\epsilon_2$ |
| $q'_3$ | $q'_5$ | $\epsilon_3$ |
| $q'_{16}$ | $q'_2$ | $\epsilon_2$ |
| $q'_{15}$ | $q'_1$ | $\epsilon_1$ |

We start by accessing $q'_5$ and storing it in register $r_1$, and accessing $q'_{15}$ and storing it in register $r_2$. Register $r_2$ is allocated to the variables that are altered (output variables), where register $r_1$ is allocated to the free variables. At this point we generate the first code pattern for $q'_j \leftarrow q'_j + \epsilon q'_i$ with

| | | |
|---|---|---|
| loadi | $r_1$ | $q'_5$ |
| loadi | $r_2$ | $q'_{15}$ |
| load | $r_3$ | $\epsilon_8$ |
| mpy | $r_3$ | $r_1$ |
| add | $r_2$ | $r_3$. |

Having generated the elemental augmentation code, the first pointer points to row 1, and we proceed with the first pass of the second pointer. We find that $q'_{15}$ is found in the eighth row, and the i table entry is not found in the j column between the first row and the eighth row. Accordingly, we move the eight row to the second row (pushing down the remaining rows), advance the first pointer to the second row, and generate the second code pattern

| | | |
|---|---|---|
| loadi | $r_1$ | $q'_1$ |
| load | $r_3$ | $\epsilon_1$ |
| mpy | $r_3$ | $r_1$ |
| add | $r_2$ | $r_3$. |

At this point the first pass ends, and we proceed to the second pass, looking for an i table entry with $q'_1$. Not having found one, at the end of the second pass we store the contents of register $r_2$, advance the first pointer to the third row and repeat the first code pattern for $q'_{12}$ and $q'_4$. The above-described procedure as applied to the entire table results in the table shown below.

| j | i | $\epsilon$ |
|---|---|---|
| $q'_{15}$ | $q'_5$ | $\epsilon_3$ |
| $q'_{15}$ | $q'_1$ | $\epsilon_1$ |
| $q'_{12}$ | $q'_4$ | $\epsilon_7$ |
| $q'_{11}$ | $q'_6$ | $\epsilon_6$ |
| $q'_7$ | $q'_5$ | $\epsilon_5$ |
| $q'_3$ | $q'_5$ | $\epsilon_8$ |
| $q'_4$ | $q'_2$ | $\epsilon_2$ |
| $q'_{16}$ | $q'_2$ | $\epsilon_2$ |

It may be realized that in the above example it is assumed that only two registers are available for holding $q'$ values. When more registers are available, additional savings can be had. For example, if another register were available, the $q'_5$ value fetched in the first row would not have needed to be recalled in the fifth row and, in fact, rows five and six in the above table could have been moved to rows three and four. The same principle can be applied to the output variables. If an output variable is to be altered with another row in which the i table entry is not free, such an output register can be held in an additionally available hardware register until such time as the i table entry becomes free.

It may be realized that the process described above is not one that is carried out in the "mainline" of executing the Karmarkar method. Rather, it is a process that prepares a program to be carried out at some later time. In a sense, what we have described in connection with code generation is a compilation process for the simple Fortran program described above, which can be used to evaluate block 82 in FIG. 4. Our procedure is different from conventional compiling, however, in that it is sensitive to the actual data that is manipulated from iteration to iteration, as compared to the static program structure.

Our code generation approach is useful generally for situations where the data does not change, or changes seldomly. In the case at hand, where the A matrix for any particular optimization problem is fixed and hence the $\overline{L}$ matrix is dynamically fixed ($\overline{L}$ does change in block 94 of FIG. 3), our code generation procedure yields a very efficient code, where the processing time in carrying out the code generation is more than offset by the saving in processing time when carrying out the matrix products of block 82. Our code generation procedure is carried out in block 94 of FIG. 3.

Use Of Our Method And Apparatus

Currently, the best mode contemplated by us for carrying out our invention is a general purpose processor or processors connected to the system whose operation, or whose resource allocation, is to be optimized. As described above, this arrangement is depicted in FIG. 5. By "general purpose" we mean that the processor is not "hard wired" to perform only our procedure, but is programmable. So far, we have applied the optimizer which embodies our method to simulations of facility planning applications, such as designing the number of telecommunications trunks and lines required between diverse locations network (e.g., telecommunications) flow optimization tasks; transportation industry allocation and operation optimization tasks (such as the airline industry), dynamic non hierarchical routing, and others. By way of example of the the improvements attained with out method, in a sample optimization task where the A matrix has 6400 rows and 12,800 columns, and 25,600 non-zero terms, the commercially available MINOS V program required 40,518 iterations and consumed 979 minutes of CPU time on a VAX 8700. With our method, in contradistinction, only 36 iterations were required, and only 11.6 minutes of CPU time were consumed. A speedup by a factor of 84. In a transportation application with 6,400 rows and 15,000 columns, the MPSX/WIZARD (the old simplex algorithm) failed to find an optimal solution in about 20 hours of CPU time on the IBM 3090 model 400 machine. Equivalent estimate time for the MINOS program on our optimizer apparatus was about 720 hours, while our method arrived at a solution in 98 minutes!

From the above it can be appreciated that what we are able to do with our preconditioned asymmetric conjugate gradient method, the maximal * cover, outer product, and code generation is to achieve a result that was not practical heretofore; to wit, realize apparatus that is capable of improving the operation of a system and in some application, on a real time basis. The frequency of use of our method and apparatus in a commercial environment will, practically, depend on the nature of the task and its size. In a facility design situation, for example, our method will be used only a few number of times. In a transportation optimization situation, on the other hand, our method will be used regularly, and with a frequency that will depend on the time that is required to arrive at a solution. In a banking environment, however, we expect a use that is somewhat in between.

We claim:

1. A calculator for developing a product Bw, where B is a sparse matrix and w is a vector, comprising:
    means for entering signals representative of matrix B and vector w into said calculator;
    memory means responsive to said means for entering for storing matrix B in sets of columns where one set comprises columns with at least two of non-zero valued entries in each column, said sets being stored with row references to said entries of non-zero values;
    means for dividing each of said sets into subgroups of columns characterized by each column in each of said subgroups having a non-zero value in a common row;
    means, responsive to said means for dividing, for deleting from said memory means duplicate instances of said common row references, to form a reduced stored list of row references;
    means, responsive to said reduced stored list, for developing a product signal equal to $$\sum_{i=1}^{n} w_i b_i,$$

where each $b_i$ is a column in matrix B and each $w_i$ is an element of said vector w; and
    means for delivering said product signal out of said calculator.

2. The apparatus of claim 1 wherein said memory means comprises means for storing said B matrix in a list that groups said columns of said B matrix into sets, where one set represents columns that include a single entry of non-zero value and stores row references of said non-zero valued columns; another set represnets columns that contain two non-zero values of equal sign, and stores row references of said equal signed columns; and still another set represents columns that contain two non-zero values of opposite sign, and stores row references of said opposite signed columns;

3. Apparatus for developing a matrix product $AD^2A^Tw$, where A is a matrix comprising columns $a_i$, D is a diagonal matrix, and w is a vector, comprising:
    first means having a storage for storing said A matrix in a list that groups said columns of said A matrix into sets, where one set represents columns that include a single entry of non-zero value and stores row references of said non-zero valued columns; another set represents columns that contain two non-zero values of equal sign, and stores row references of said equal signed columns; and still another set represents columns that contain two non-zero values of opposite sign, and stores row references of said opposite signed columns;
    second means for dividing each of said sets into subgroups of columns characterized by each column in each of said subgroups having a non-zero value in a common row;
    third means responsive to said first means for deleting from storage duplicate instances of said common row references, to form a reduced stored list of row references; and
    fourth means, responsive to said reduced stored list, for evaluating $$\sum_{i=1}^{n} d_i^2 (a_i^T w) a_i.$$

where $d_i$ is the element in the $i^{th}$ row of said D matrix.

4. The apparatus of claim 3 wherein said fourth means evaluates $$\sum_{i=1}^{n} d_i^2 (a_i^T w) a_i$$

with apparatus comprising:
    means for developing a dot product of each column in said A matrix, $a_i$, with vector w to yield a scalar $a_i^T w$, where i is a summation index;
    means for multiplying said scalar with the diagonal entry in row i of said D matrix, $d_i$, squared;
    means for developing a vector signal $d_i^2(a_i^T w)a_i$; and
    means for accumulating the vector signals developed by said means for developing a vector signal to produce a resultant vector from the sum $$\sum_{i=1}^{n} d_i^2 (a_i^T w) a_i.$$

* * * * *